United States Patent [19]

Stella

[11] Patent Number: 4,895,461
[45] Date of Patent: Jan. 23, 1990

[54] COMBINED RADIAL AND THRUST BEARING

[75] Inventor: Leo Stella, Bristol, Conn.

[73] Assignee: The Torrington Company, Torrington, Conn.

[21] Appl. No.: 267,558

[22] Filed: Jan. 3, 1989

[51] Int. Cl.⁴ .................. F16C 19/36; F16C 19/49; F16C 33/80

[52] U.S. Cl. .................. 384/454; 384/480; 384/607

[58] Field of Search ................ 384/452–455, 384/477, 480, 607, 614

[56] References Cited

U.S. PATENT DOCUMENTS

| | | | |
|---|---|---|---|
| 466,437 | 1/1892 | Simonds | 384/453 |
| 595,060 | 12/1897 | Gridley | 384/453 |
| 1,203,164 | 10/1916 | Warner et al. | 384/454 |
| 1,205,539 | 11/1916 | Hirth | 384/454 |
| 1,296,827 | 3/1919 | Lyons et al. | 384/454 |
| 1,943,864 | 1/1934 | Heim | 384/454 |
| 2,208,724 | 7/1940 | Griswold | 384/454 |
| 3,168,359 | 2/1965 | Murphy | 384/454 |
| 3,414,341 | 12/1968 | Murphy | 384/607 X |
| 4,109,977 | 8/1978 | Staphan | 384/454 |

FOREIGN PATENT DOCUMENTS

| | | | |
|---|---|---|---|
| 366849 | 1/1923 | Fed. Rep. of Germany | 384/454 |
| 468104 | 6/1914 | France | 384/453 |
| 545081 | 10/1922 | France | 384/454 |

Primary Examiner—Thomas R. Hannon
Attorney, Agent, or Firm—Frank S. Troidl

[57] ABSTRACT

The combined radial and thrust bearing has an annular series of rollers in the annular space between an inner race and an outer race for taking radial forces. The thrust bearing part includes a pair of axially spaced apart washers at each longitudinal end of the bearing. An annular series of balls are located in the annular space between the washers. The ball bearing retainer is dimensioned so that a very close clearance exists with the two washers in order to maintain a very small labyrinth clearance for sealing purposes.

6 Claims, 2 Drawing Sheets

COMBINED RADIAL AND THRUST BEARING

BACKGROUND OF THE INVENTION

1. Field of the Invention

The present invention relates in general to a radial and thrust bearing assembly, more specifically to a roller radial and ball thrust bearing assembly that includes a labyrinth seal.

2. Description of the Prior Art

In an early design disclosed in U.S. Pat. No. 1,296,827, patented Mar. 11, 1919 by L. W. Lyons and J. Wills, a radial roller bearing which uses load carrying rollers that are spaced apart by smaller rollers instead of by cage means, incorporates a pair of concentric, easily replaceable, tubular metal sleeves for inner and outer races. Roller limiting collars axially abut the inner race on each side of the raceway. Each collar includes a flange which projects radially beyond the inner surface of the sleeve to form an endwise limiting means for the rollers. Radially disposed, parallel, planar housing collars or washers, locate at their outer peripheries against annular shoulders on the outer race. At their inner peripheries, the washers closely approach the roller limiting collars adjacent to the outer surface of the flanges, without forcibly touching or having any frictional contact with the collar or flanges. Set screws through the outer race, bear on the outer periphery of each washer to hold it in place. Mounted on the bearing shaft, held in place by split ring, shoulder, or other means, are end members of a pair of ball thrust bearings. The balls run between raceways located on the end members and on the outer surfaces of the washers.

This arrangement provides a combination radial and thrust bearing with closely sealing ends.

In another combination roller radial and ball thrust bearing, disclosed by W. W. Murphy in U.S. Pat. No. 3,168,359 patented Feb. 2, 1965, an enlarged portion of a shaft forms an inner race for the radial bearing. A sheet metal collar which includes the outer race for the radial bearing, includes inwardly turned, radially disposed, flanges. Caged rollers, which ride on the enlarged portion of the shaft, are axially contained by the inner faces of thrust collars located on the shaft at each end of the inner race. The thrust collars rest against, and extend above, annular shoulders formed at each end of the race by the difference between the major diameter of the race and the outer diameter of the shaft. The outer faces of the thrust collars and the inner faces of the radially disposed flanges include races for caged balls, establishing thrust bearings which resist axial movement in both directions, of the shaft with respect to the collar.

A resiliently mounted combination radial and axial thrust bearing is disclosed in U.S. Pat. No. 4,109,977, patented Aug. 29, 1978, by Gerard Staphan. The bearing holds a rotating shaft within a bore by way of insertion of the outer race, within a resilient sleeve of elastomeric material that lines the bore. The outer race of the radial bearing, extending the width of the bearing rollers, abuts axially at one end by means of an inwardly turned radially oriented annular wall, against a shoulder in the resilient sleeve. The other end of the cylindrical sleeve portion of the outer race extends free of contact with the elastomer, into an annular cavity within the resilient sleeve. The inner race of the radial bearing extends from a position under the wall, where it abuts axially against a shoulder on the shaft, to a position beyond the width of the rollers, and ends with an outwardly turned radially oriented wall. The inner surface of the outwardly turned wall includes a race for a thrust bearing. The other race for the thrust bearing is provided by a radially oriented annular wall which axially abuts the free end of the outer race, and which is held in place against the resilient sleeve by an outwardly turned axially oriented cylindrical flange.

SUMMARY OF THE INVENTION

The present invention provides a combination radial and thrust bearing in which there is a radial bearing having an inner and outer race, and an inner and outer raceway spaced to form an outer-inner raceway annulus for bearing rolling members. An annular series of bearing rolling members are in the annulus.

A first, radially disposed washer, is located by an outer periphery of the inward face, against an axially-receiving stop face on the outer race. The outward face of the washer includes a raceway for a thrust bearing.

A second, radially disposed washer is coaxial with and axially spaced from the first washer, and has an inward facing raceway opposed to the raceway on the first washer, forming an annulus between &:he raceways for rolling members of the thrust bearing.

The second washer includes a first, axially oriented, inward projecting member which is located radially outwardly from the bearing rolling members.

The second washer further includes a second, axially oriented, inward projecting member which is located radially inwardly from the bearing rolling members. The second member is fixedly mounted on the inner race of the radial bearing.

Bearing rolling member retainer means for spacing the members apart, includes a circumference and an annular outer surface that is in close proximity to the second washer, and an annular inner surface that is in close proximity to the first washer, for forming a seal. Further seal is provided by the first inward projecting member being in close proximity to the first washer.

DESCRIPTION OF THE PREFERRED EMBODIMENTS

Figure 1:
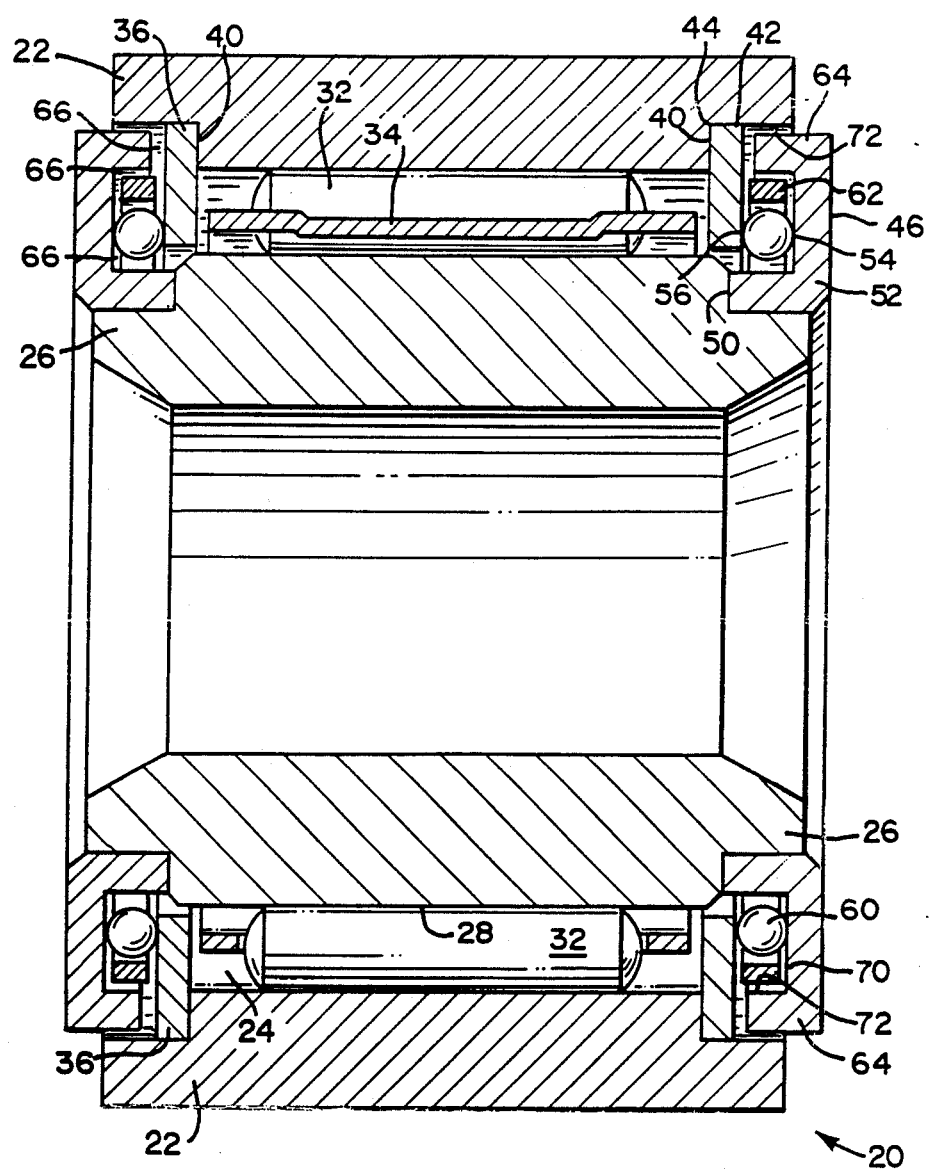
FIG. 1 is a cross-sectional view of a bearing according to the invention.

The invention will now be described by way of example, and is not limited in its application to the details of construction and arrangement of parts illustrated in the drawings, since the invention is capable of other embodiments. The phraseology or terminology employed is for the purpose of description only and not of limitation.

Bearing 20, shown in FIG. 1, includes radial bearing outer race 22 with raceway 24, inner radial bearing race 26 with raceway 28. Bearing rollers 32 in retainer 34 locate radially between the raceways, and axially between each of the two inner washers 36. On each end of the bearing, inner washer 36 rests against bearing end facing surface 40, and locates radially against radially inward facing surface 42 of shoulder 44 of outer race 22. Inner washer 36 does not contact inner race 26.

Washer 46 at each end of the bearing, outboard of and facing toward inner washer 36, abuts against bearing end surface 50 of inner race 26 by way of flange 52 which spaces thrust bearing raceway 54 of the washer from raceway 56 of inner washer 36. Washers 46 are "C" shaped in cross-section.

Balls 60 and retainer 62 run between raceways 54 and 56, and radially within the confines of inwardly turned flanges 64 and 52 of outer washer 46. Retainer 62 has a width and outer diameter that establishes a small labyrinth clearance 66 between the retainer and inner washer 36, and adjacent inner faces 70 and 72 of outer washer 46, for sealing of the bearing.

Outer washer 46 is fixedly installed on inner race 26 by press fit against the radially outward facing surface of inner race 26. In lieu of press fit, post welding or other fastening means may be used to appropriately secure the washer on the inner race.

Inner race 26 is independent of the shaft (not shown) on which bearing 20 locates. This need not be the case, however.

Figure 2:
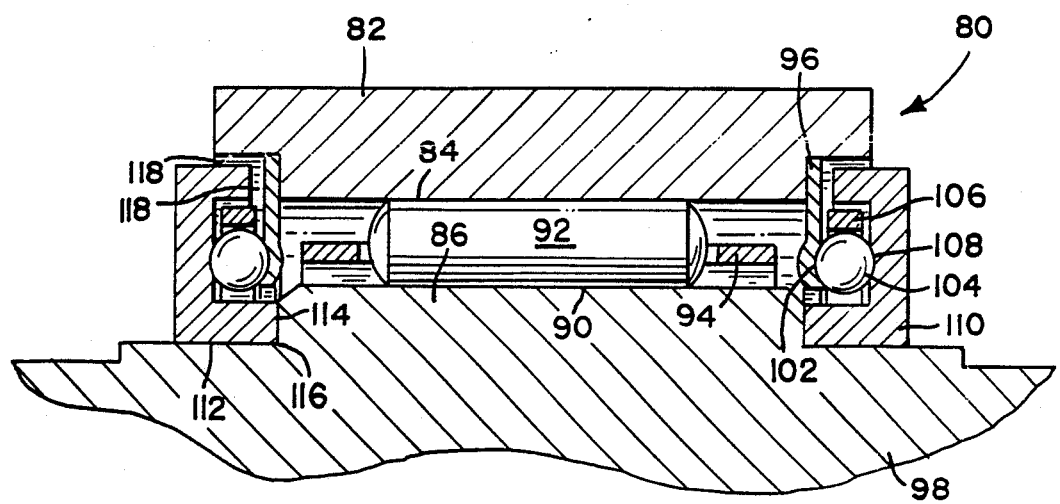
FIG. 2 is a cross-sectional view of a portion of a second bearing embodiment and rotatable shaft.

Bearing 80, FIG. 2, designed to accept heavier thrust loads than bearing 20, includes radial outer race 82, radial inner race 86, and raceways 84 and 90 for rollers 92 and retainer 94. Radial inner race 86 is a part of rotatable shaft 98.

Inner washer 96 limits axial displacement of rollers 92 at each end of raceway 84. Washer 96 includes grooved raceway 102 of a thrust bearing that includes balls 104, retainer 106, and grooved raceway 108 of outer washer 110. The grooves contribute to support against additional thrust load. Washer 110 is preferably press fit onto intermediate raised diameter surface 112, and against radial face 114 of annular step 116. Inner race 90 is located on the fully raised diameter of shaft 98.

Small labyrinth clearance 118 is provided by retainer 106, sized to fit closely spaced to adjacent surfaces on inner washer 96 and outer washer 110.

Rigid, unyielding raceways in a thrust bearing necessitate some small clearance between the ball and raceway in order to avoid binding of the ball between the raceways. Binding with close fit in such a bearing can occur from slight distortion of surfaces caused by temperature or loading. Axial play, therefore, can occur between the outer and inner radial races, by an amount equal to the clearances between the thrust bearing ball and raceways.

Figure 3:
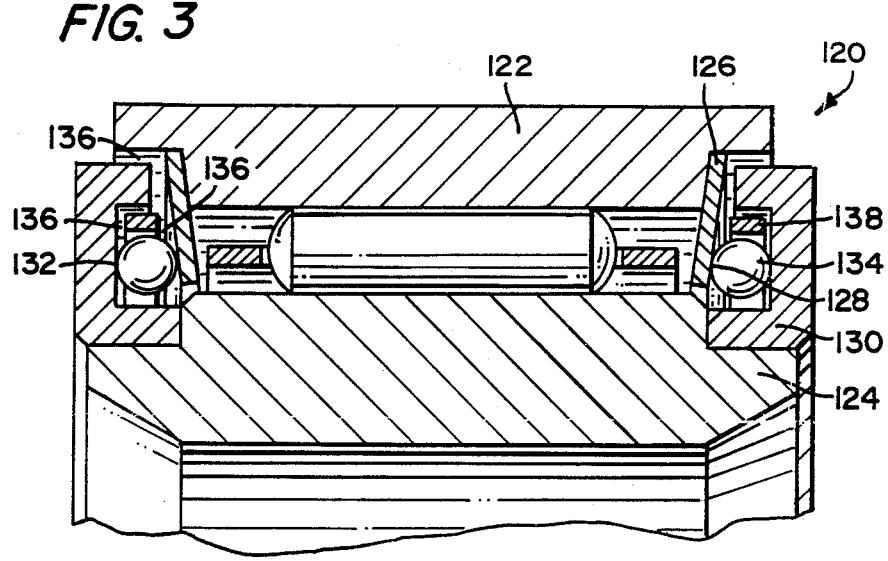
FIG. 3 is a cross-sectional view of a portion of a bearing according to a third embodiment of the invention.

This can be overcome by bearing 120 shown in FIG. 3. Bearing 120 resists axial play between radial outer race 122 and inner radial race 124. In bearing 120, inner washer 126 raceway 128 is preloaded by washer 130, which is "C" shaped in cross-section, by way of outer washer raceway 132 and ball 134. Inner washer 126 is made from a resilient or spring-like material. Although washer 126 is shown deflected to an inward angle, it may be shaped so that it is vertical or angled outward under preload. One way to effect this is to make inner washer 126 from a Belleville type washer.

Use of the preloaded washer has no detrimental effect upon the labyrinth clearance 136 as long as the width of retainer 138 is set to allow for minimum spacing that is expected to occur between the two washers at surfaces adjacent to the retainer.

Washer stiffness and clearance between the outer washer and the radial outer race may be selected to permit spring controlled limited axial displacement between the radial bearing inner and outer races for shock resistance or other desirable purposes. With preload, axial clearance in the bearing resulting from the working tolerances of the parts is also minimized.

It is not intended that details of the embodiments described be limitations upon the scope of the invention which shall be defined by the following claims.

I claim:

1. A combined radial and thrust bearing comprising:
   a radial bearing outer race having a first, radial outer raceway;
   a radial bearing inner race having a second, radial inner raceway that is concentric with and spaced from the radial outer raceway to form an outer raceway-inner raceway annulus for bearing rolling members of a radial bearing; and
   an annular series of bearing rolling members in said annulus,
   a first, radially disposed washer, the outer periphery of the inward face of which is located against an axially receiving stop face on the outer race, the outward face of said washer comprising a third raceway,
   a second, radially disposed washer, spaced from the first washer and having an inward facing fourth raceway that is opposed to and axially spaced from the third raceway, forming a third raceway-fourth raceway annulus for bearing rolling members of a thrust bearing,
   an annular series of bearing rolling members in said third raceway-fourth raceway annulus,
   said second washer including a first, axially oriented, inward projecting member, located radially outwardly from the thrust bearing rolling members,
   said second washer including a second, axially oriented, inward projecting member, located radially inwardly from the thrust bearing rolling members; and retainer means in said third raceway-fourth raceway annulus for spacing apart the bearing rolling members located therein, said retainer means having a circumference and an annular surface in close proximity to said second washer, and an annular inner surface in close proximity to said first washer, for forming a seal.

2. The combined radial and thrust bearing described in claim 1, further comprising:
   said first axially oriented, inward projecting member being in close proximity to said first washer, for further forming a seal.

3. The combined radial and thrust bearing described in claim 1, further comprising:
   said radial bearing rolling members being rollers.

4. A combined radial and thrust bearing comprising:
   a radial bearing outer race having a first, radial outer raceway,
   a radial bearing inner race having a second, radial inner raceway that is concentric with and spaced from the radial outer raceway to form an outer raceway-inner raceway annulus for bearing rolling members, and
   an annular series of bearing rolling members in said annulus, and
   on each side of the radial bearing;
   a first, radially disposed washer, the outer periphery of the inward face of which is located against an axially-receiving stop face on the outer race, the outward face of said washer comprising a third raceway, a second, radially disposed washer, spaced from the first washer and having an inward facing fourth raceway that is opposed to and axially spaced from the third raceway, forming a third raceway-fourth raceway annulus for bearing rolling members of a thrust bearing, an annular series of bearing rolling members in said third raceway-fourth raceway annulus, said second washer including a first, axially oriented, inward projecting member, located radially outwardly from the thrust bearing rolling members, said second washer including a second, axially oriented, inward projecting member, located radially inwardly from the thrust bearing rolling members;

and retainer means in said third raceway-fourth raceway annulus for spacing apart the bearing rolling members located therein, said retainer means having a circumference and an annular outer surface in close proximity to said second washer, and an annular inner surface in close proximity to said first washer, for forming a seal.

5. The combined radial and thrust bearing described in claim 4, further comprising:

said first axially oriented, inward projecting member being in close proximity to said first washer, for further forming a seal.

6. The combined radial and thrust bearing described in claim 4, further comprising:

said radial bearing rolling members being rollers.

* * * * *